United States Patent [19]
Zech et al.

[11] 3,795,374
[45] Mar. 5, 1974

[54] AIRCRAFT HAVING ADJUSTABLE SWEPTBACK WINGS

[76] Inventors: Armin H. Zech, Emdenstrasse 48, Munich 83; Ernst R. Schaefer, Hartliebstrasse 10, Munich 19, both of Germany

[22] Filed: July 16, 1971

[21] Appl. No.: 163,337

Related U.S. Application Data

[63] Continuation-in-part of Ser. No. 746,340, July 22, 1968, abandoned.

[52] U.S. Cl.................................. 244/46, 244/48
[51] Int. Cl.............................................. B64c 3/40
[58] Field of Search...... 244/46, 42 R, 43, 45 R, 48, 244/39

[56] References Cited
UNITED STATES PATENTS

| | | | |
|---|---|---|---|
| 2,734,701 | 2/1956 | Horton | 244/43 |
| 3,206,146 | 9/1965 | Toms | 244/46 |
| 3,529,790 | 9/1970 | Buch | 244/48 |

FOREIGN PATENTS OR APPLICATIONS

| | | | |
|---|---|---|---|
| 595,494 | 12/1947 | Great Britain | 244/48 |
| 894,365 | 4/1962 | Great Britain | 244/46 |
| 1,183,921 | 3/1970 | Great Britain | 244/46 |

*Primary Examiner*—Duane A. Reger
*Assistant Examiner*—Barry L. Kelmachter
*Attorney, Agent, or Firm*—John J. Byrne; Edward E. Dyson

[57] ABSTRACT

Means for varying the sweepback and angle of incidence of the wings of an aircraft with respect to airspeed so as to maintain efficient operation. The axis of rotation of the wings is pivotal so as to permit adjustment of the axis and consequently variance of the sweep angle in accordance with airspeed. In the forward position of the wings which corresponds to takeoff and landing, the wings are parallel to the longitudinal axis of the fuselage with a zero incidence angle. In the sweptback position, the wings rise to a negative angle of incidence for greater operational efficiency during high-speed flight.

4 Claims, 12 Drawing Figures

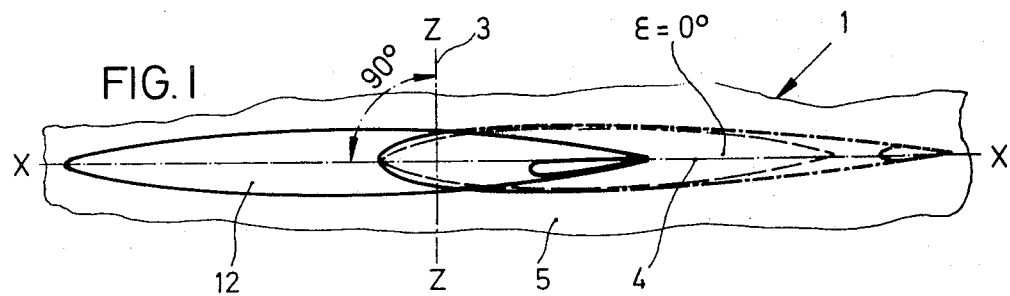
FIG. 1
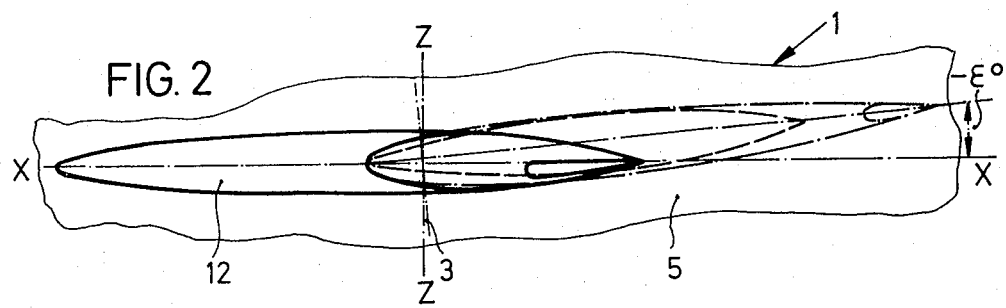
FIG. 2
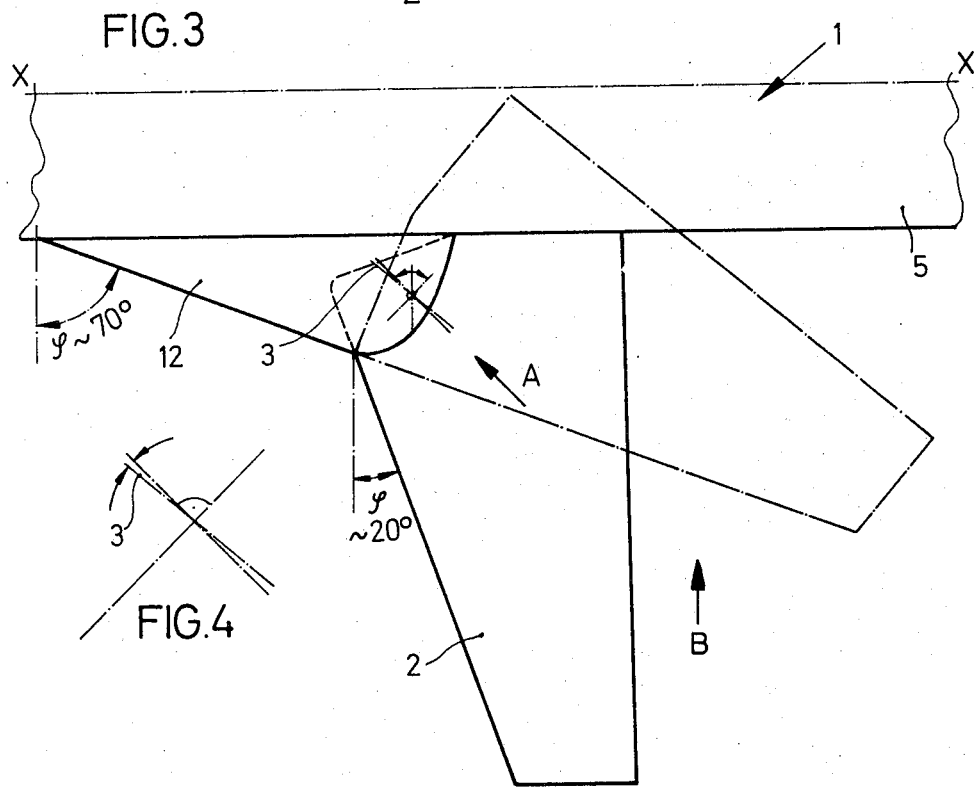
FIG. 3
FIG. 4

AIRCRAFT HAVING ADJUSTABLE SWEPTBACK WINGS

This application is a continuation-in-part application of copending Ser. No. 746,340, filed July 22, 1968, entitled AIRCRAFT HAVING ADJUSTABLE SWEPTBACK WINGS now abandoned.

This invention relates to a mounting means for aircraft wings which permits pivotal adjustment of the wing speed and aspect ratio according to the speed of the aircraft. With respect to such aircraft, the wings are swept back at high speeds in order to achieve greater airspeed, whereas at lower speeds the sweep is decreased thereby increasing the wing span and the lift capability. As a result of such sweep adjustments, the points of attack of the lift forces on the wings are displaced requiring appropriate trim in the pitch axis. Trimming devices add considerable weight to the aircraft, particularly when the aircraft is used over large mach ranges.

An objective of this invention is to provide sufficient trim in the pitch axis over wide sweep angles by a relatively simple means and by the introduction of the lowest possible trim resistance. As the aircraft speed and the sweep angle increase and the aspect ratio decreases, the invention herein compensates for the change of moments about the pitch axis resulting from the displacement of the center of lift by providing for a decrease in the angle of incidence, which in turn produces a change in the coefficient of moments. Thus, very little additional elevator or horizontal stabilizer trim is necessary.

With respect to the illustrated embodiment, this feature is achieved by adjustably tilting the wing pivot axis with respect to the normal axis of the aircraft. The wing pivot axis can be tilted so that when the wings are in their forward position at maximum span, their angle of incidence is approximately 70° but in the sweptback position the wings have a negative angle of incidence.

This arrangement results in the introduction of a minimum amount of additional trim resistance as the wings are pivoted. Further, the stresses upon the wings which take the form of bending moments are reduced, and greater vertical separation between wing tips and horizontal tail is achieved.

Other features and advantages of this invention will become apparent through reference to the following description and accompanying drawings which show an illustrative embodiment of this invention.

FIG. 1 is a fragmentary side view of an aircraft having a wing pivot axis which is vertical to the wing chord;

FIG. 2 is a fragmentary side view of an aircraft with a wing pivot axis which forms an oblique angle with the wing chord;

FIG. 3 is a fragmentary top view of the aircraft illustrated in FIG. 2;

FIG. 4 is a graphical illustration of the angular position of the pivot axis seen in the direction of the arrow A of FIG. 3;

For purposes of illustration, it is assumed that a supersonic aircraft 1 is provided with a pair of wings 2 which pivot on a fixed wing section facilitating alteration in the wing sweep. The axis 3 about which the wing pivots are positioned is vertical with respect to the wing chord 4, so that it is parallel to the normal axis Z—Z of the aircraft. In this case, the angle of incidence $\epsilon$ of the wing with reference to the X—X axis of the fuselage equals 0°, both in the forward position of the wings with a sweep angle $\alpha$ of about 20° and in the swept back position with a sweep angle $\alpha$ of about 70°, as illustrated in FIG. 1.

In order to alter the wing sweep, the axis 3 about which the wing pivots is disposed at an oblique angle with the wing chord 4, as illustrated in FIG. 2. The angle of incidence $\epsilon$ of the wings 2 equals 0° in the forward position with a sweep angle of 20°. The angle of incidence $\epsilon$ decreases with increasing sweep until, finally, in the swept back position corresponding to a sweep angle of about 70°, it becomes negative in value.

The canted position of the pivot axis 3 is illustrated in FIGS. 3 and 4. FIG. 3 is a plan view, and FIG. 4 is a graphical diagram taken in the direction of arrow A of FIG. 3. Further, the canted position of the axis 3 is illustrated in FIG. 2 in the direction of the arrow B of FIG. 4.

Figure 5:
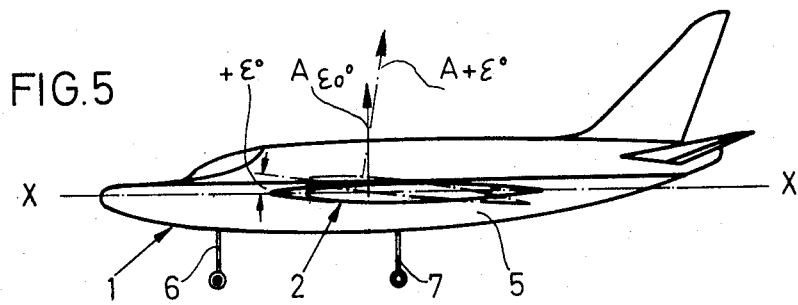
FIG. 5 is a side view of an aircraft having certain features of this invention during the take-off flight phase.
Figure 6:
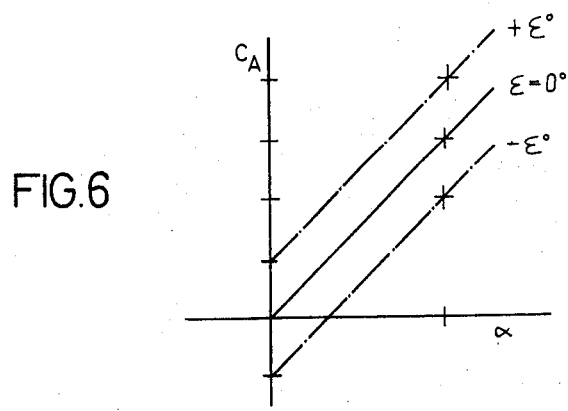
FIG. 6 is a graphical illustration at various lift values for the angle of incidence with respect to the angle of attack relative to the fuselage axis.

With reference to FIG. 5, an aircraft is illustrated having a positive angle of incidence $\epsilon$ which is desirable during take-off and landing as this results in a greater lift, less stress upon the landing gears 6 and 7, and a positive nose-up moment for normal take-off, as illustrated in FIG. 6.

Figure 7:
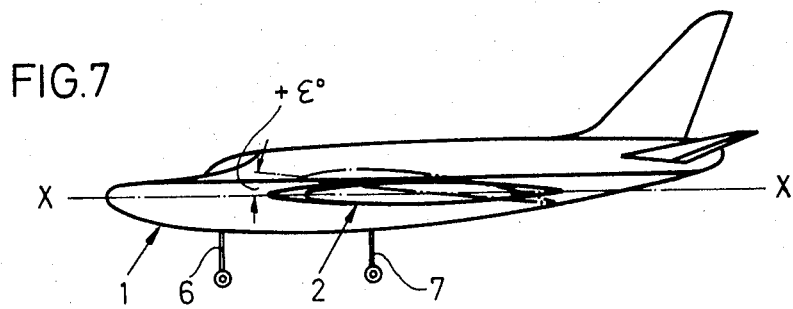
FIG. 7 is a side view of the aircraft of FIG. 5 during landing.
Figure 8:
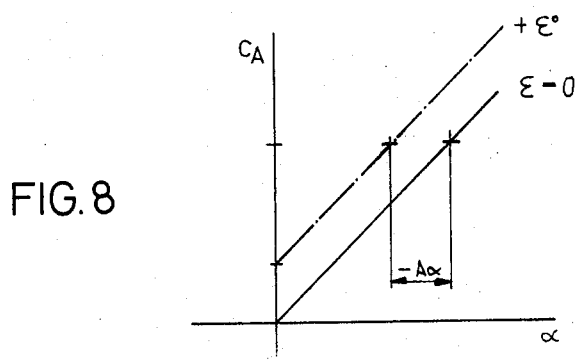
FIG. 8 is a graphical illustration of the lift coefficients for various angles of incidence with respect to the angle of attack relative to the fuselage axis for the flight attitude in FIG. 7.

A positive angle of incidence as illustrated in FIG. 7, is also desirable during landing or approach since the lift coefficient remains the same and the angle of attack of the fuselage 5 decreases, resulting in a better ground view for the pilot during landing. The applicable lift coefficients are illustrated in FIG. 8.

Figure 9:
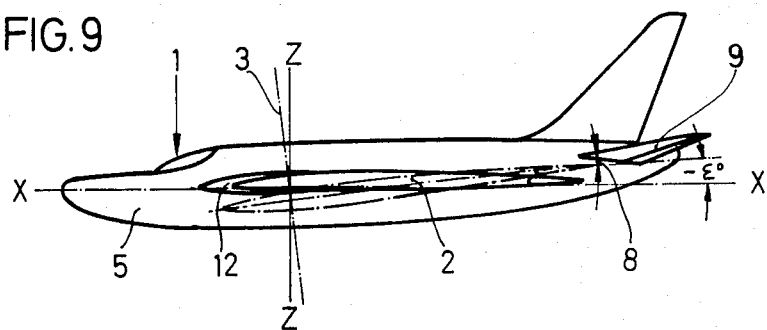
FIG. 9 is a side view of the aircraft of FIG. 5 during high-speed flight.

Whereas, FIGS. 5 through 8 are applicable to the forward position of the wings 2 with a sweep angle $\alpha$ of about 20°, conditions change when the means for attaining wings are swept back to a sweep angle $\alpha$ of about 70° for high-speed flight, as is shown in FIG. 9. In FIG. 9, the solid lines illustrate the position of the wings 2 when the wings are swept back about an axis which is parallel to the normal axis Z—Z. As the wing pivots about an axis which is not canted with respect to the normal axis, the angle of incidence $\epsilon$ remains constant both for the sweptback position and the forward position of the wings.

When the axis is canted according to the invention, the wings 2 assume a position which is represented in phantom in FIG. 9; that is, the angle of incidence $\epsilon$ decreases in the sweptback position, which in turn reduces the vertical distance between the tips of the wings 2 and the horizontal tail 9.

Figure 10:
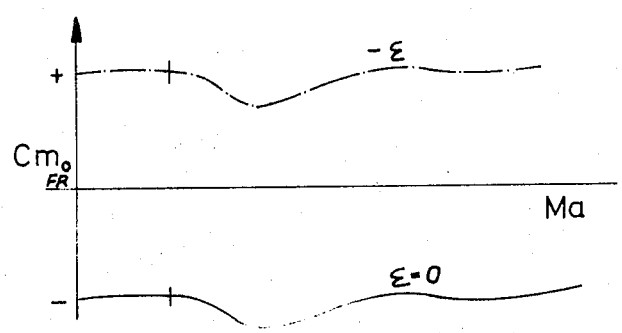
FIG. 10 is a graphical illustration of the $C_{mo}$— coefficients of the illustrated wing-fuselage arrangement with respect to the aircraft speed or mach number.

FIG. 10 illustrates the changes in $C_{mo}$— values versus mach number of speed during high-speed flight for the two illustrated wing-fuselage configurations. The broken lines apply to a wing-fuselage configuration wherein the wings are pivotal about a canted axis, and the solid lines apply to a wings-fuselage configuration with wings swept back about an axis parallel to the normal axis Z—Z of the aircraft.

Figure 11:
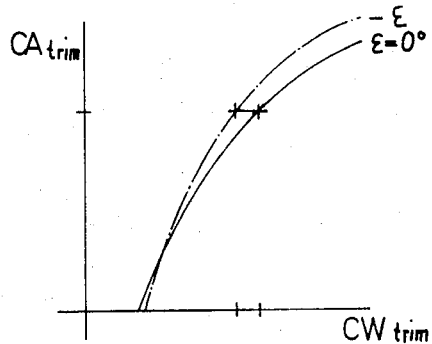
FIG. 11 is a graphical polar diagram of the trim values.

FIG. 11 is a polar diagram of various trim values. The solid line of FIG. 11 relates to an aircraft with the wings swept back about an axis parallel to the normal axis of the aircraft, and the broken line relates to an aircraft with the wings swept back about an axis which is canted.

Figure 12:
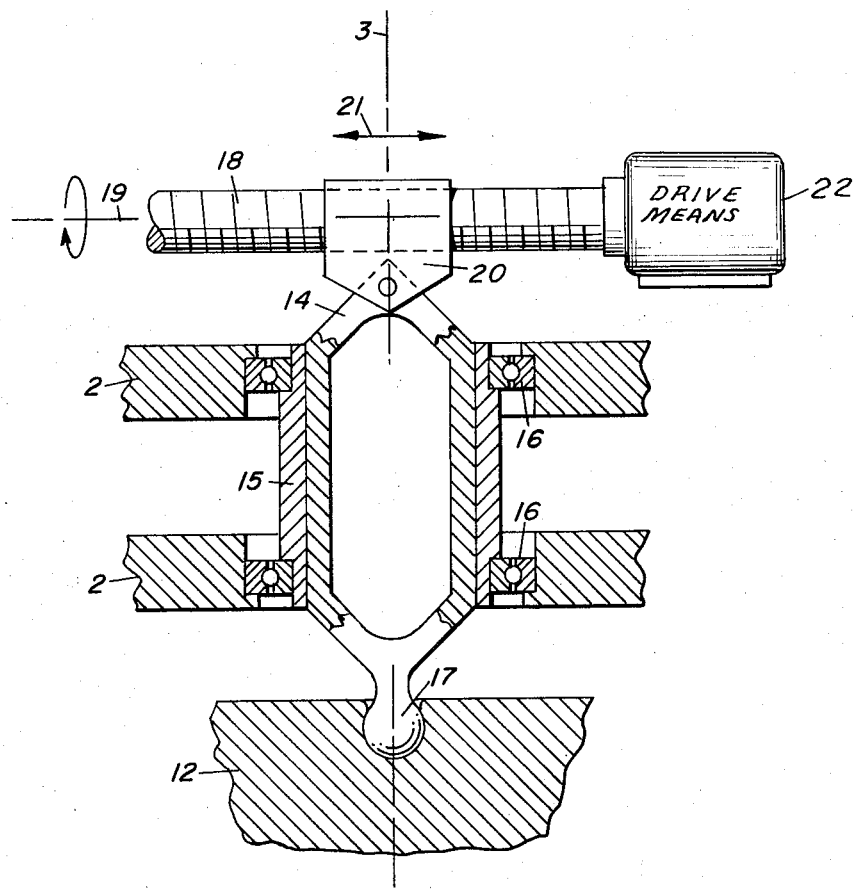
FIG. 12 is a partial cross-sectional view of a particular wing mounting and axis tilting mechanism.

An example of a particular mechanism to tilt the axis 3 is shown in FIG. 12. The movable wing 2 is mounted for pivotal movement about a cylindrical bearing 14 having a central longitudinal axis corresponding to the axis 3 diagrammatically illustrated in FIGS. 2 and 3. The bearing 14 includes a concentric bushing 15 having seats thereon for receiving anti-friction bearings 16 which are interposed between the movable wing 2 and the bushing. The bearing or pivot 14 is pivotally attached at its lower end to the fixed wing portion 12 of the fuselage by a ball and joint arrangement 17 which permits universal tilting movement of the bearing pin. A threaded collar or nut 20 is pivotally attached to the upper end of the bearing 14 and receives a threaded jack screw or worm drive 18. It is to be understood that the worm drive 18 is suitably supported in the upper portion of the fixed wing 12 by means not shown. A suitable drive means 22 is actuated in response to control means within the aircraft to rotate the jack screw 18 such that the threaded collar or nut 20 moves to the right or to the left in the direction of arrows 21 shown in FIG. 12. This movement in turn causes the bearing 14 and therefore the longitudinal axis 3, to tilt about a point defined by the ball and joint connection 17. With reference again to FIG. 3, the longitudinal axis 19 of the jack screw extends at an angle relative to the longitudinal axis X of the aircraft such that when the collar 20 is caused to move to the left, for example, the upper end of the pivot pin will be caused to tilt in a direction forwardly and outwardly of the aircraft, or with reference to FIG. 3, in a path defined by the line 19.

By providing automatic control means, the axis 3 can be caused to assume various angulated positions in response to the sweep movements of the wings, causing the wings to assume the appropriate angle of incidence for the particular mode of operation of the aircraft, i.e., landing and take-off or high-speed flight.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

We claim:

1. An aircraft having variable sweptback wings, particularly adapted for supersonic flight, characterized by an axis of rotation between said wings and said aircraft which extends upwardly and forwardly and downwardly and inwardly of said aircraft said axis of rotation passing through the same fixed point independent of the angle of sweep of said wings whereby the wings are in a substantially horizontal plane in their forward position and rise to provide an angle of incidence in their sweptback position.

2. An aircraft according to claim 1 characterized by the fact that the angle of said axis is variable.

3. An aircraft having a fuselage and variable sweptback wings, a cylindrical bearing pivotally connecting each wing to said fuselage and defining an axis of rotation, first means for attaching said bearing at its lower end to said fuselage for universal movement, second means for adjustably tilting said bearing and said axis of rotation relative to the longitudinal and transverse axes of said aircraft, said second means comprising driven screw means received in a threaded collar attached to said bearing adjacent the upper end thereof, said screw means being mounted on said fuselage and extending to said bearing, and drive means for rotating said screw and causing said bearing to tilt about a pivot point defined by said first means.

4. An aircraft as defined in claim 3 wherein said third means is a ball and socket connection.

* * * * *